July 25, 1944.  E. ORSHANSKY, JR  2,354,608

VALVE

Filed Oct. 12, 1940

INVENTOR
Elias Orshansky, Jr.
BY
Duell, Kaus and Smoot
ATTORNEYS

Patented July 25, 1944

2,354,608

UNITED STATES PATENT OFFICE 2,354,608

VALVE

Elias Orshansky, Jr., University Heights, Ohio, assignor, by mesne assignments, to The Marquette Metal Products Company, Cleveland, Ohio, a corporation of Ohio Application October 12, 1940, Serial No. 360,887

3 Claims. (Cl. 137—139)

This invention relates to a structurally and functionally improved control, and especially a control for the flow of fluid such as liquids.

In certain respects it is an object of the invention to furnish a unit of this type which will be an improvement on the structure disclosed in the prior application in which I am named as co-inventor and which application was filed in the United States Patent Office on August 27, 1938, and is identified under Serial No. 227,072, now Patent No. 2,225,082, granted Dec. 17, 1940.

A further object is that of constructing a control of the foregoing type and which will be especially useful when employed in association with lines containing fluid under relatively high pressures and by means of which the flow of the fluid through such lines may be controlled with complete accuracy and by a more or less automatic sequence of operations.

As such, the present invention will be of especial value when employed in connection with aircraft and specifically airplanes. However, and as will be obvious in the following specifications, a unit embracing the present improved construction may be employed to advantage in numerous other associations.

An additional object is that of providing an apparatus of the aforementioned character and which will embody relatively few parts, each individually simple and rugged in construction, these parts being largely capable of manufacture by quantity production methods and being susceptible of ready assemblage. When so assembled, a unitary and relatively light control is presented which will operate over long periods of time with freedom from all difficulties.

Figure 1:
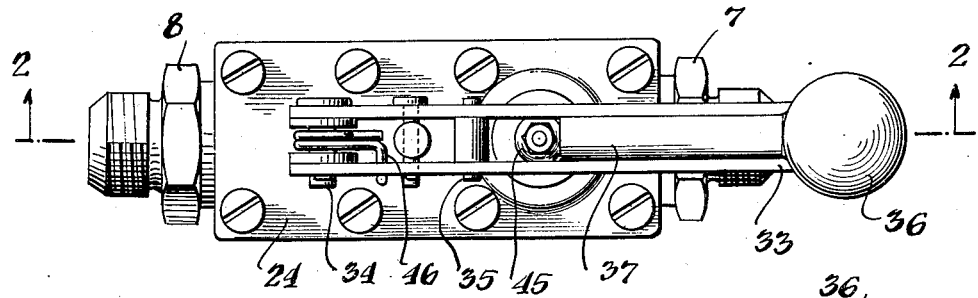
Figure 2:
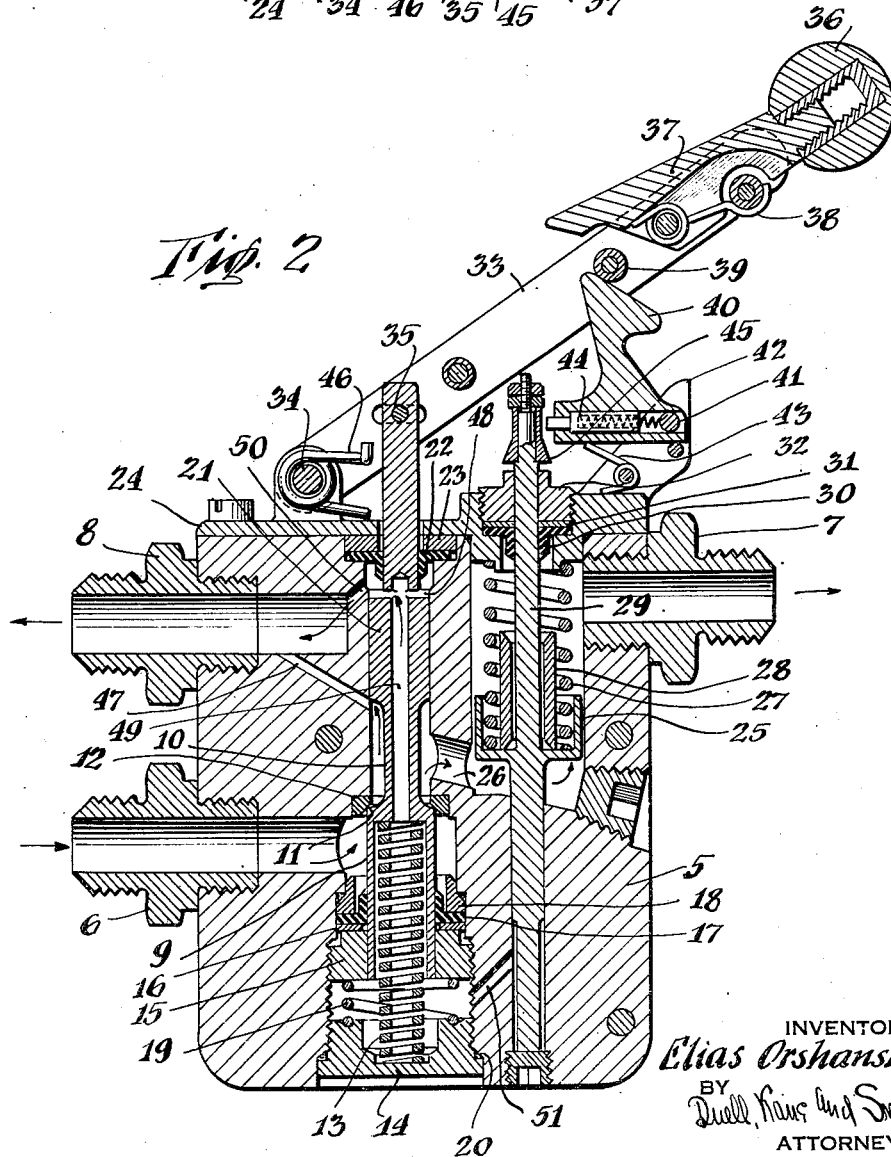

With these and other objects in mind, reference is had to the attached sheet of drawings, illustrating one practical embodiment of the invention and in which, Fig. 1 is a plan view of a control member; and, Fig. 2 is a sectional side view of the same taken along lines 2—2 and in the direction of the arrows as indicated in Fig. 1.

In these views the numeral 5 indicates a block or body formed of any suitable material and which is provided with bores defining ports to which fittings 6, 7 and 8 may conveniently be coupled. The fitting 6 is to be connected to a line extending from a source of fluid supply under pressure. The fitting 7 is to be connected to a line in turn coupled to the unit which is to be supplied with fluid. The fitting 8 is coupled to a line which may conveniently extend to the sump or reservoir which may constitute a source of supply for fluid which is to be put under pressure.

In order not to unnecessarily confuse the present illustration and description, these lines and the associated apparatus have not been illustrated. Suffice it to say that in the case of an airplane, the fitting 6 might be coupled to the auxiliary pump—which in the case of a hydraulic control system in an airplane—supplies fluid under pressure. The fitting 8 may likewise be connected to the intake side of the pump either through an intermediate structure such as a supply tank, or otherwise. The fitting 7 may extend to the propeller pitch-varying mechanism of the airplane and by means of which the pilot may adjust the propeller to feathering and unfeathering positions. The foregoing is, of course, illustrative and it is obvious that a control embodying the improved construction of the present invention might be interposed in various other types and systems of fluid lines.

The body 5 is formed with further bores which extend between the fittings 6, 7 and 8, and within the bore which is adjacent the inlet and discharge ports a control valve is positioned. This valve may be modified in numerous respects, but preferably includes, as shown, a body 9 from which a stem 10 extends. Adjacent the point of juncture of this stem with the body, a shoulder portion 11 is provided. The edge of this portion is relatively sharp or reduced in area, and cooperates with a seat member. In this manner a line-seal is provided. The body 9 is constantly urged towards its seat by means of a spring 13, one end of which extends into a bore formed within the body and the opposite end of which bears against a nut 14 closing the lower end of the passage within which the valve is disposed. This nut may be retained in position by being mounted on screw threads formed in such passage. These screw threads may also serve to mount a retaining nut 15 which bears against a washer 16 in turn acting against a packing 17 and a sealing ring 18. The latter bears against a shoulder in the passage so that it is incapable of dislodgment.

A locking spring 19 may be interposed between the nuts 14 and 15 in order to prevent accidental movement of the parts with respect to each other. Also, as indicated, for example, at 20, seals may be provided at various points in the assembly and to prevent any leakage of fluid. The packing herein referred to, as well as these seals, may be formed of any desirable material but it is preferred that the latter be formed of a material such as "Neoprene," having in mind that the fluid which is being controlled will ordinarily be oil.

As illustrated, the valve body 9 is guided to have sliding movement by the packing 17 and the nut 15, which latter is provided with a bore for the accommodation of such body. Likewise, the stem 10 is enlarged as indicated at 21 to have a sliding fit with the walls of the bore. Consequently, as the stem is reciprocated, the entire valve assembly will be properly guided. Leakage will be prevented adjacent the lower end of the valve by means of the packing, while leakage adjacent the upper end of the valve may be prevented by encircling the upper end of the stem with a suitable layer of packing 22 and which is retained in position by a washer 23 in turn retained by the cover plate 24.

A second bore extends preferably parallel to and spaced from the bore which accommodates the valve. Within this second bore a piston 25 is disposed, and this piston has a loose fit so that fluid may flow between its skirt and the wall of the bore. The body 5 is formed with an opening 26 affording communication between these two bores and so that fluid may flow from the valve through this opening and past the piston. The latter is normally retained in the position shown in Fig. 2 by employing a spring 27, and a sleeve member 28 may be interposed between this spring and the stem 29 mounting the piston; this sleeve acting as a stop to limit the upward movement of the piston.

The lower end of the stem extends into a reduced portion of the bore which accommodates the piston. The upper end of such stem is encircled by packing 30 retained in position by a washer 31 and a nut 32. The latter is formed with an opening to permit of the passage of the stem.

Now with a view to actuating the valve, it will be noted that a lever 33 is pivotally mounted as at 34 by the cover plate 24, and this lever is connected by a pin-and-slot coupling 35 with the upper end of the stem 21. Consequently, as the lever is swung downwardly and upwardly, it follows that the valve is moved to unseated position, and from the latter position is returned to seated position.

As afore brought out, the present unit is primarily adapted for employment in connection with liquids under high pressures. Due to the particular valve construction which has been shown, it is apparent that a more or less balanced structure is provided. In other words, it is not necessary to unseat the valve against the action of the liquid. Also, the valve in moving towards its seat is not substantially influenced by the flow of liquid past it. These are desirable factors in that with pressures running from 500 to in excess of 1500 pounds to the square inch, it is apparent that if the fluid did directly act on the valve, it would be extremely difficult to unseat the latter, and also during a seating of the parts the unit might become damaged. Also, as a consequence of the line-seal provided, the spring 13 need not be of high value. With the relatively reduced areas which are presented, only a minor amount of force is necessary to assure a pressure such that any appreciable leakage between the valve and its seat will be prevented.

Now returning to the consideration of the valve-actuating mechanism, it will be seen that the lever 33 adjacent its outer end may pivotally support a knob 36. This knob is coupled to a rod 37 and a spring 38 is associated with the parts so that the arm and knob are normally maintained in the position shown but are capable of limited rocking movement with respect to the lever. The lever also supports a detent which may be in the nature of a bar 39 and this bar may cooperate with a latch 40 which is pivotally supported as at 41 by a bracket 42 mounted by body 5. A spring 43 normally retains the latch in a position at which it engages the detent 39.

A spring-pressed plunger 44 is mounted by the latch 40 and is cooperable with a flared sleeve 45 mounted on the upper end of stem 29; it being observed that when the stem and sleeve are moved to a position at which the latter clears the end of plunger 44, such plunger will engage under the edge of the sleeve.

Now considering the operation of the unit and presuming that it will be coupled to apparatus of, for example, the nature afore described, an operator desiring to effect a flow of liquid from fitting 6 through fitting 7, simply depresses lever 33 by means of the knob 36. In so doing, the detent 39 will over-ride latch 40 and the lever will be retained in depressed position.

With such movement of the lever, valve 9 will be shifted to unseated position and fluid will now flow from fitting 6 past the valve seat 12 through passage 26 and will act against piston 25. The piston will consequently move upwardly and compress the spring 27 and maintain plunger 29 and latch or sleeve 45 in its maximum upward position.

A control embodying the present construction is intended to function automatically to shift to inoperative position upon a change in the rate of flow of the fluid occurring. Such a change will obviously occur as the mechanism which is connected to fitting 7 receives its full charge of liquid. As the rate of flow diminishes, a condition will be established wherein the force exerted by the spring 27 substantially equals the pressure and drag exerted by the fluid in flowing past the piston. With further diminution in the rate of flow, the force exerted by spring 27 will cause the piston to be shifted downwardly, as viewed in Fig. 2. With such shifting, the latch or sleeve 45 will co-act with plunger 44 to cause the latch 40 to be swung against the action of spring 43. It follows that latch 40 will move to a position at which it will clear detent 39. Consequently, the lever 33, under the action of the spring 46 associated with its pivot, will move upwardly. This will in turn cause valve 9 to be moved to seated position and to interrupt further flow.

In the event an operator, after initiating the foregoing cycle, decides that he wishes to interrupt the flow, he may readily accomplish this by simply pulling upwardly on the knob 36. With such functioning of the parts, the outer end of arm 37 will be caused to cam against the upper inclined face of latch 40, to swing the latter against the action of spring 43, and to thus release the detent 39 and the lever 33. This will obviously cause the parts to return to their normal position.

With the valve in closed position, a certain amount of return drainage may occur through the fitting 7. This fluid will, of course, flow past the piston 25, through passage 26 and thence around the reduced portion 10 of the stem. From this point it may flow through a passage 47 to the port which has coupled to it the fitting 8. Likewise, as will be observed, the valve and its stem may be formed with a bore 49 through which fluid may flow to passages 48 formed in the stem and communicating with a passage 50 formed in body 5, and again communicating with the discharge port. The passages 48 have been shown as extending at right angles to the bore 49. It is apparent that they might be extended in any desired direction so long as with the parts in inoperative position, unobstructed communication is afforded to the discharge port. These passages and bore will serve to allow the escape of liquid which has been trapped below the nut 15 and so that no resistance due to trapped liquid will be encountered and as the valve is shifted. It will also be observed that the port which accommodates stem 29 may be formed with a passage 51 extending to the valve accommodating bore and through which trapped liquid may pass to the discharge opening.

It will, of course, be appreciated that stem 29 as well as the enlarged portion 21 of stem 10, preferably have lapped fits with respect to the walls of the bores within which they are disposed. In this manner undue leakage is prevented; and moreover, the enlarged portion 21 will obviously act as a valve in conjunction with passage 47 and so that as valve 9 is opened, high-pressure fluid may not flow towards the discharge port of the control.

In conclusion, it will be understood that in certain instances it might be desired to operate the control to a point beyond that at which an appreciable change in the rate of flow of the fluid would occur. As is apparent, such operation may be secured by simply maintaining a pressure on the lever 33. Under these circumstances and even after the piston 25 has dropped in response to the action of spring 27, the valve 9 will be maintained in open position. Consequently, fluid will continue to flow from fitting 6 to fitting 7 so long as the parts connected to the latter fitting are capable of receiving additional fluid.

From the foregoing it will be appreciated that among others, the several objects of the invention as specifically afore noted, are achieved. Obviously, numerous changes in construction might be resorted to without departing from the spirit of the invention as defined by the claims.

I claim:

1. A control including in combination a body formed with inlet and outlet openings and with passages and bores connecting said openings, a valve mounted within said body for preventing a flow of fluid from one opening to the other when said valve is in seated position, manually operable means connected to said valve for moving the latter to unseated position and said means including a movable lever, a detent carried by said lever, a pivotally mounted latch supported by said body and cooperable with said detent, a spring-pressed plunger carried by said latch and means for normally urging said latch into detent-engaging position, means disposed within said body and in advance of said outlet opening to shift in response to a change in the rate of flow of the fluid emerging from said outlet opening, a rod forming a part of said last named means and a flared sleeve mounted by said rod and adapted to cam past said spring-pressed plunger; said rod and sleeve upon subsequently shifting causing said plunger to move said latch to release the latter from said detent and thereby permit said lever to assume a position at which said valve is in closed position.

2. A control including in combination a body formed with inlet and outlet openings and with passages and bores connected between said openings, a valve for permitting a flow of fluid from one opening to the other, means for unseating said valve including a pivotally mounted lever, a detent associated with said lever, a latch movably mounted by said body and cooperable with said detent to maintain said lever in a predetermined position and with said valve in open position and a pivoted extension forming a part of said lever and cooperable with said latch whereby said extension may cause said latch to move to detent-releasing position.

3. A control valve including in combination a body formed with inlet, outlet, and discharge openings and with passages and bores extending between and connecting all of said openings, means for closing the ends of one of said bores, a main valve movably positioned within such bore and controlling the flow of fluid from said inlet to said outlet opening, a stem extending from said main valve and within said bore to a point beyond said body, operating means coupled to said stem; said stem and main valve being formed with bores extending through to the exterior face of said stem and adjacent the discharge opening and through which bores leakage fluid may flow toward said discharge opening when said main valve is in closed position.

ELIAS ORSHANSKY, Jr.